(12) United States Patent
Diamond et al.

(10) Patent No.: US 11,758,634 B2
(45) Date of Patent: Sep. 12, 2023

(54) VEHICLE INTERIOR LIGHT ACTIVE FOCUS

(71) Applicant: FORD GLOBAL TECHNOLOGIES, LLC, Dearborn, MI (US)

(72) Inventors: Brendan F. Diamond, Grosse Pointe, MI (US); Keith Weston, Canton, MI (US); Michael A. McNees, Flat Rock, MI (US); Anthony J. Maraldo, Southgate, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 242 days.

(21) Appl. No.: 17/239,828

(22) Filed: Apr. 26, 2021

(65) Prior Publication Data

US 2022/0346207 A1 Oct. 27, 2022

(51) Int. Cl.
| | |
|---|---|
| *H05B 47/115* | (2020.01) |
| *G06F 3/01* | (2006.01) |
| *B60Q 3/80* | (2017.01) |
| *G01J 1/42* | (2006.01) |
| *H05B 47/11* | (2020.01) |
| *H05B 47/16* | (2020.01) |
| *B60Q 3/76* | (2017.01) |

(52) U.S. Cl.
CPC ............. *H05B 47/115* (2020.01); *B60Q 3/76* (2017.02); *B60Q 3/80* (2017.02); *G01J 1/4204* (2013.01); *G06F 3/013* (2013.01); *H05B 47/11* (2020.01); *H05B 47/16* (2020.01)

(58) Field of Classification Search
CPC ...... H05B 47/11; H05B 47/16; H05B 47/115; B60Q 3/72; B60Q 3/76; B60Q 3/80; G06F 3/013
See application file for complete search history.

(56) References Cited

U.S. PATENT DOCUMENTS

| | | | |
|---|---|---|---|
| 10,059,263 B2* | 8/2018 | Paszkowicz | B60Q 1/24 |
| 10,906,381 B1* | 2/2021 | Muhammad | B60J 3/0204 |

(Continued)

FOREIGN PATENT DOCUMENTS

| | | |
|---|---|---|
| CN | 111137208 A | 5/2020 |
| EP | 2390139 B1 | 12/2012 |

(Continued)

*Primary Examiner* — Alexander H Taningco
*Assistant Examiner* — Pedro C Fernandez
(74) *Attorney, Agent, or Firm* — Frank L. Lollo; MacMillan, Sobanski & Todd, LLC

(57) ABSTRACT

A plurality of light sources are mounted in a vehicular passenger cabin. Each light source illuminates a respective illumination zone with a midpoint. Each light source is configured to illuminate at a plurality of brightness levels up to a full brightness. A gaze tracker monitors an occupant cabin to detect a gaze point. A controller responds to an illumination request from the occupant to actuate at least two light sources to illuminate the passenger cabin at the gaze point. The controller uses the gaze point to select a respective brightness level for each light source based on a proximity of the gaze point to respective midpoints of the illumination zones. At least a first one of the actuated light sources with a midpoint closer to the gaze point provides a higher brightness level than a second one of the actuated light sources with a midpoint farther from the gaze point.

17 Claims, 5 Drawing Sheets

(56) References Cited

U.S. PATENT DOCUMENTS

2010/0014711 A1* 1/2010 Camhi .................. B60K 35/00
382/104
2011/0096165 A1* 4/2011 Zeng ................. B60K 31/0008
348/148

FOREIGN PATENT DOCUMENTS

| EP | 3902377 A1 | * | 10/2021 | ............. H05B 45/20 |
| GB | 2571266 A | * | 8/2019 | ............... B60Q 3/20 |
| JP | 4811223 B2 | | 11/2011 | |
| WO | WO-2017120248 A1 | * | 7/2017 | ............. A61B 3/113 |

* cited by examiner

VEHICLE INTERIOR LIGHT ACTIVE FOCUS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to lighting systems in automotive vehicles, and, more specifically, to focused lighting that follows a gaze of an occupant to illuminate an area where the occupant is looking.

Passenger vehicles such as cars and trucks typically have a variety of interior lights throughout a passenger cabin to illuminate different areas at different times to assist an occupant during darker outside conditions. Some lights such as a dome light may illuminate larger areas in a center portion of the cabin, while other lights such as a floor-well light or a map light provide a more compact illumination in a specific area of the cabin. Typical controls for activating specific ones of the lights include manual switches to toggle the lights on and off. Some lights may be automatically controlled according to external, ambient light conditions or according to the state of other systems or elements (e.g., the opening/closing of a door).

Manually turning lights on and off may be cumbersome and time-consuming, especially when the occupant may be unfamiliar with all the details of the vehicle (e.g., a rental car) and when the location of a particular control switch is inconvenient to reach due to other actions being taken by the occupant. Therefore, some systems have been suggested in which a gaze of the occupant (i.e., driver or other vehicle user) is tracked, and a light may be automatically activated which is located in the space where the occupant is looking.

Light sources deployed in a passenger cabin may provide flood lighting over a relatively larger area or a more restricted illumination field covering a specific region of the cabin. Flood lighting (e.g., a dome light) may provide more light than is necessary to see the intended areas and may result in glare or distraction. At the same time, the flood lighting may be blocked from reaching some areas. Therefore, a combination of many light sources covering different regions can be used. To provide illumination targeted to only an area where an occupant may be looking may require a number of light sources that becomes impractical due to cost of all the light sources, wiring, and controls.

Another consideration facing the deployment of interior lighting systems in vehicles relates to "dark adaptation" of the occupants (e.g., the recovery of the eyes' sensitivity under low light conditions after being exposed to bright lights). Under some ambient light conditions (e.g., dusk), an optimal brightness for the interior lights may depend on the expected level of dark adaptation as well as the visual contrast between areas which are lit by an internal light source and those lit by ambient light. Both of these factors may change under darker ambient conditions, resulting in the optimal brightness of the light sources being different. Thus, the recovery of dark adaptation (e.g., of a driver) after looking away or turning the interior lights off may be inconsistent or non-optimal.

SUMMARY OF THE INVENTION

The invention includes an in-vehicle interior light system with active focus that can actively adjust which lights in the vehicle are turned on and off. A focus of the active lights is based on where the occupant of the vehicle is looking, and brightness levels provided by each light may be adjusted according to a relationship of each light to the area of interest. A video camera or other sensor can be used to monitor an orientation of the occupant's face and/or eyes. Based on a "line of focus" of the drivers face/eyes, an area of interest can be identified.

Based on the area of interest, certain lights are turned on and off to best illuminate the area. To provide a field of illumination that creates a focusing of light around the area of interest, some of the light sources are activated at a brightness level less than a full brightness. A brightness level of a particular light source can be set according to its proximity to the area of interest (e.g., a light output is brighter for sources closer to the area of interest). A set of standard brightness levels can be defined and stored as a map. Individual brightness preferences can also be learned based on brightness adjustments made by a particular user during different situations. Light sources may automatically turn on (at varying brightness levels) and off as the user moves or rotates their view around the vehicle in a seemingly continuous (non-binary) shifting. The user can be in any part of the vehicle (e.g., a driver or passenger). If there are multiple occupants, the invention can be applied to multiple occupants or a single occupant, as needed. In order for a light source to focus its output to a particular location, it can be mounted to a swivel to articulate to the correct location. The invention can be configured to actuate only certain lights, to avoid exposing a driver to a bright light that may interfere with dark adaptation or with driving. When the vehicle is moving, automatic light activation may have a limited functionality.

A user can request an automatic light activation using a clap, spoken command, or a manual control (e.g., a switch which is part of an infotainment system). Simple spoken or manual commands may be used to indicate which occupant or occupants in the vehicle that the lighting system is being activated for. The light field being generated may be narrow (e.g., concentrated on only the desired area) to provide the best available visibility of objects in the area of interest. The invention can also be applied to controlling exterior light sources in the same fashion wherein 1) the light sources are attached to body components, and 2) the light sources are lit when the presence of the owner/driver is detected.

In some embodiments, a warm light source (e.g., red-orange spectrum) is used during dark conditions. A warm light source may include an LED device emitting in the 2000K to 3000K temperature band. In some embodiments, a cool light source (e.g., yellow-green spectrum) is used for other driving conditions include dusk-like conditions. A cool light source may include an LED device in the 3000K to 6500K temperature band.

In one aspect of the invention, a passenger vehicle has a passenger cabin configured to receive a plurality of occupants. A plurality of light sources are mounted in the passenger cabin. Each light source is configured to illuminate a respective illumination zone in the passenger cabin, and each zone has a midpoint. Each light source is configured to illuminate at a plurality of brightness levels up to a full brightness. The vehicle includes a gaze tracker monitoring an occupant of the passenger cabin to detect a gaze point to which the occupant is looking. A controller is responsive to an illumination request from the occupant to actuate at least two of the light sources to illuminate the passenger cabin at the gaze point. The controller uses the gaze point to select a respective brightness level for each light source based on a proximity of the gaze point to respective midpoints of the illumination zones. At least a first one of the actuated light sources with a midpoint closer to the gaze point provides a higher brightness level than a second one of the actuated light sources with a midpoint farther from the gaze point.

DETAILED DESCRIPTION OF PREFERRED EMBODIMENTS

Figure 1:
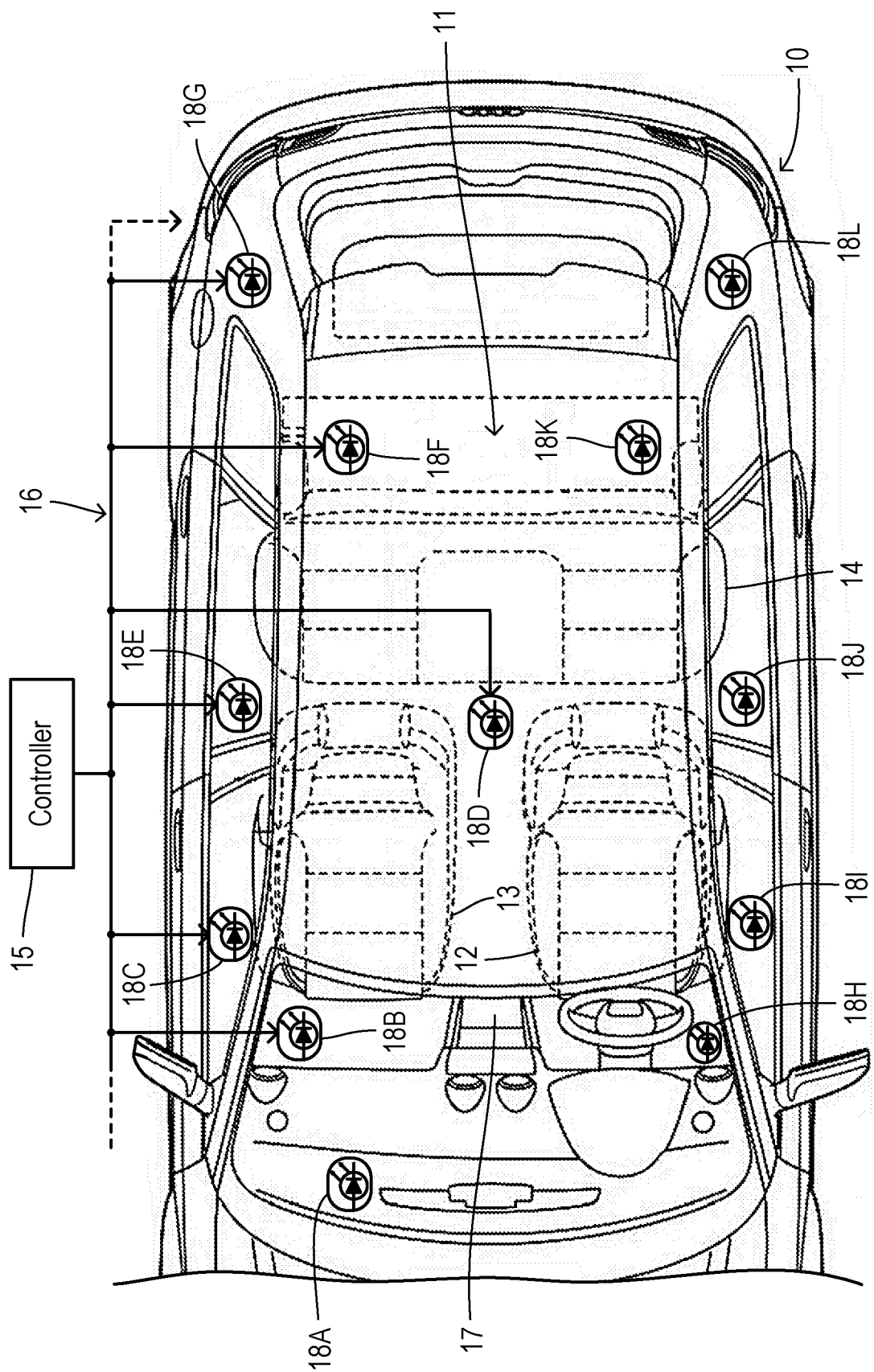
FIG. 1 is a top, plan view showing a vehicle with an interior lighting system.

Referring to FIG. 1, a vehicle 10 (which may be an internal combustion vehicle, electric vehicle, or hybrid vehicle) has a passenger cabin 11 with a driver seat 12, front passenger seat 13, and rear passenger seats 14. An electronic controller module 15 is coupled by a communications/power network 16 to a plurality of light sources 18A-18L. Each light source 18A-18L is mounted in a respective location which is configured to provide illumination to a corresponding part of cabin 11. A control panel 17 in cabin 11 has manual switches or other controls within reach of occupants in seats 12 and 13 to selectably control light sources 18A-18L. At least some of light sources 18A-18L have adjustable output brightness levels (i.e., are dimmable). For example, light sources 18A-18L may be comprised of light-emitting diode (LED) assemblies using housings and lenses as known in the art. Each light source 18A-18L is configured to illuminate a respective illumination zone in passenger cabin 11. For example, light source 18B may have an illumination zone directed toward a foot well in front of seat 13. Each illumination zone may correspond to a region receiving a light intensity above a threshold intensity. The region may have a corresponding midpoint (which may be defined as a geometric center of the region or a location of peak brightness within the region, for example).

Figure 2:
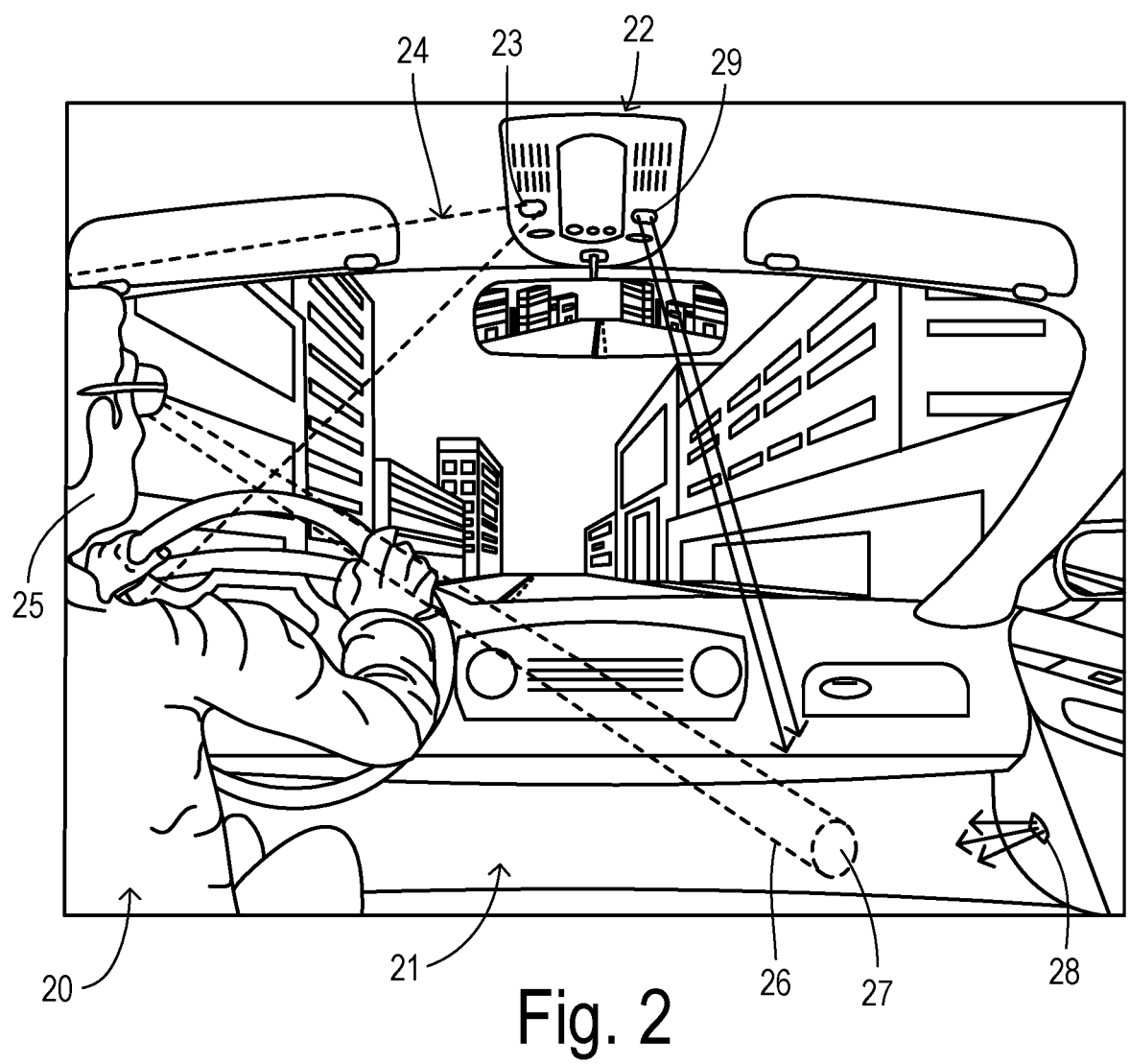
FIG. 2 is a diagram depicting a eye-tracking system determining a gazing direction of a driver within a passenger cabin.

FIG. 2 depicts a driver 20 who is driving a vehicle from a driver seat in a passenger cabin 21. An overhead console 22 has a driver-tracking camera 23 with a field of view 24 covering a face 25 of driver 20. Driver 20 is looking along a gaze direction 26 so that driver 20 looks upon a gaze point 27. A light source 28 is mounted in a foot well and has an illumination zone that includes gaze point 27. Another light source 29 is mounted in overhead console 22 and has an illumination zone that also includes gaze point 27. In some embodiments of the invention, light sources with illumination zones that include gaze point 27 are activated to jointly provide illumination to assist the occupant, with the light sources being activated at respective brightness levels which are based on (e.g., proportional to) the degree of proximity between their midpoints and gaze point 27. Consequently, a focused light field is generated which concentrates the projected light according to the occupant's area of interest. Beneficial light near the area of interest is maximized and peripheral light it muted such that helpful illumination is provided without creating glare or reducing contrast around the area of interest.

Figure 3:
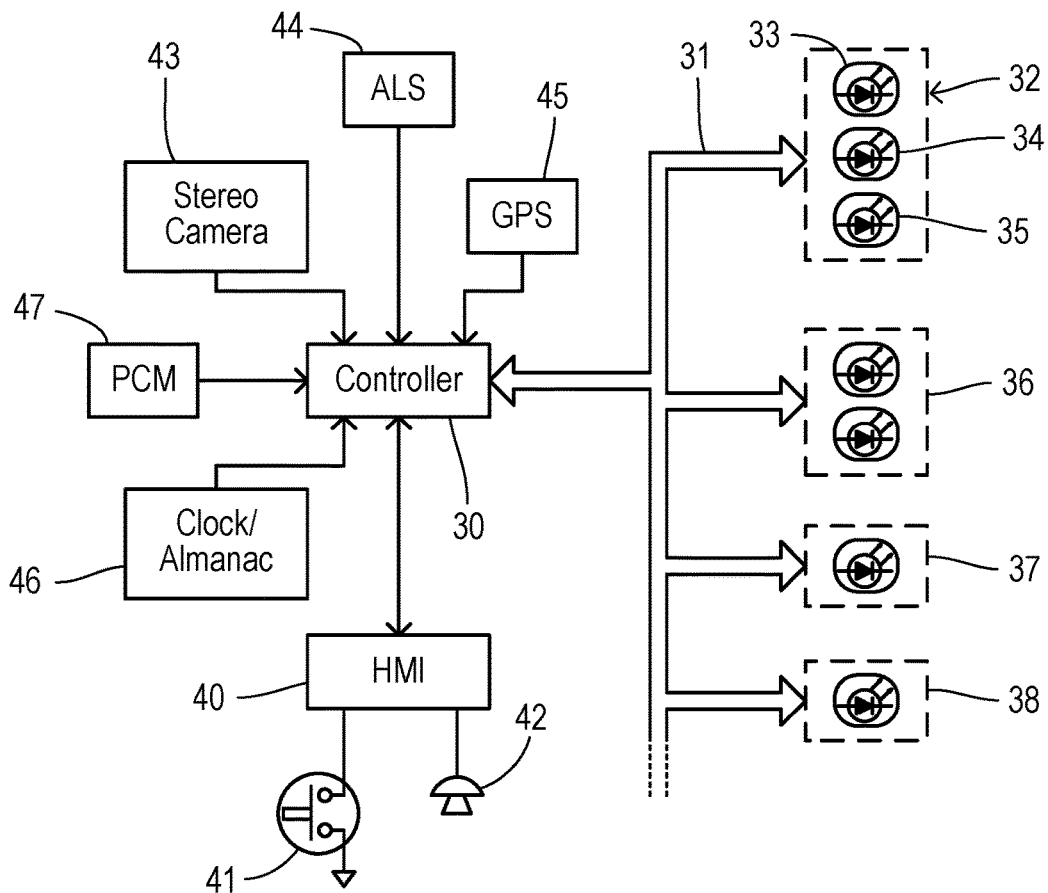
FIG. 3 is a block diagram showing portions of a vehicle according to one preferred embodiment of the invention.

An example system of the invention is showing in FIG. 3, wherein an controller 30 is connected by a power/communication network 31 to a plurality of lighting modules 32, 36, 37, and 38. Some lighting modules may have a plurality of lighting devices, such as module 32 which has LEDs 33, 34, and 35 and module 36 which has two LEDs. Controller 30 is coupled to a human-machine interface (HMI) 40 which may include one or more manual switching elements 41 (e.g., toggle switches or soft switches on a touchscreen display) and a microphone 42 for receiving spoken voice commands. A stereo camera 43 is coupled to controller 30 for use in imaging the user (e.g., driver) to determine a gaze point. To determine an ambient light level (e.g., to differentiate between daylight, dusk, and dark conditions), an ambient light sensor (ALS) 45 is coupled to controller 30. Alternatively, expected light conditions can be obtained us a GPS-based locator 45 and a clock/almanac 46 which provide supporting data to enable controller 30 to determine dark and dusk conditions based on a location of the sun in the sky. For example, almanac 46 may include a solar ephemeris. Locator 45 and solar almanac 46 can be used to obtain a sunset time or sunrise time, and controller 30 determines the ambient lighting condition in response to a difference between an actual local time and the obtained sunset or sunrise time.

Controller 30 is coupled to a powertrain control module 47 to receive a data signal that identifies a driving status of the vehicle, such as whether the vehicle is moving, the gear selector is out of park position, the engine is running, or the like. Based on the data signal, availability of certain light sources and/or brightness levels may be inhibited so that the driver is not exposed to bright light while driving.

When a user wishes to activate light sources according to a direction of their gaze, then the user may initiate an illumination request via HMI 40. For example, the illumination request may be comprised of a manual action by the occupant in which switching element 41 is manually pressed and a corresponding signal is sent to controller 30. Alternatively, HMI 40 may include a speech recognition system, and the illumination request may be comprised of a spoken command which is captured using microphone 42.

The purpose of having several LEDs in a module may be for increasing an area of the illumination zone, increasing an available light intensity, or enabling light emission having an adjustable spectrum (e.g., at a selectable color temperature). For example, LED 33 may be a cool light source, LED 34 may be a warm light source, and LED 35 may provide daylight emission. Cool light sources may have a color temperature in a range of about 3000K to about 6500K, and warm light sources may have a color temperature in a range of about 2000K to about 3500K. In some embodiments of the invention, light sources are selected for activation to best preserve an occupant's level of dark adaptation based on whether an ambient lighting condition of the passenger cabin is in a dusk range or in a dark range. In controlling a generated light field, controller 30 may utilize a respective map relating coordinates of the user's gaze point to a corresponding brightness level to be provided by each respective light source. Controller 30 may utilize a set of dusk maps when the ambient lighting condition in the dusk range and may utilize a set of dark maps when in the dark range.

Figure 4:
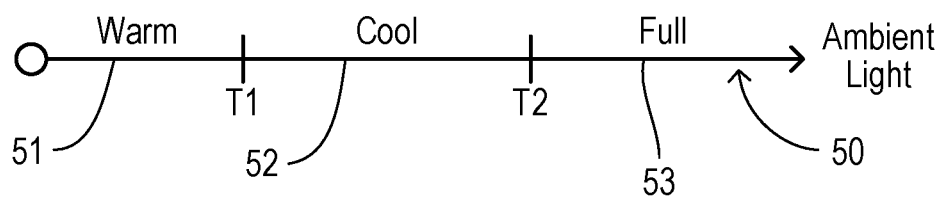
FIG. 4 is a plot of ambient brightness showing a color temperature of associated light sources.

FIG. 4 shows a plot 50 relating a magnitude of the ambient light intensity to corresponding ranges. Thus, when the ambient light level is below a first threshold T1, a dark range 51 is detected. During dark range 51, warm light sources may be exclusively activated so that use of the interior lighting has minimal effect upon the dark adaptation of the user. When the ambient light level is between first threshold T1 and a second threshold T2, a dust range 52 is detected. During dusk range 52, cool light sources may be exclusively activated for better visibility when the user's vision is partially dark adapted. When the ambient light level is above second threshold T2, a moderate range 53 is detected. In moderate range 53, a fuller light spectrum may be produced (e.g., by activating dedicated light source having a daylight color temperature and/or by activating warm and cool light source simultaneously).

Figures 5A, 5B:
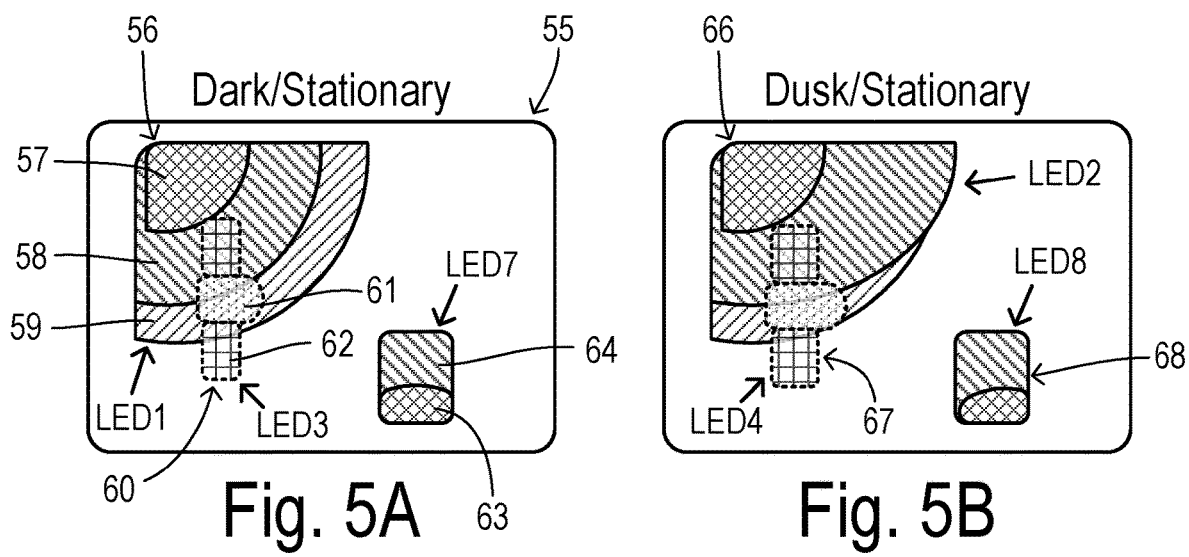
FIGS. 5A, 5B, and 5C are graphical depictions of brightness maps.
Figure 5C:
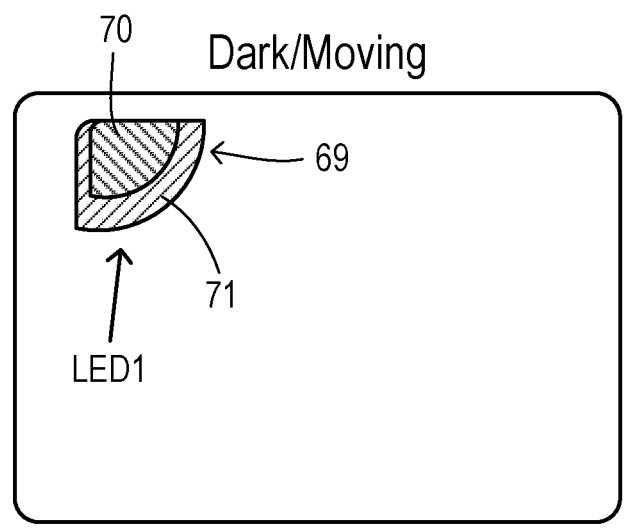

FIGS. 5A, 5B, and 5C show examples of light-level maps. Maps may be provided for use in different scenarios, such as 1) a map for use in dark ambient light while the vehicle is stationary, 2) a map for use in dusk ambient light while the vehicle is stationary, 3) a map for use in dark ambient light while the vehicle is moving, and 4) a map for use in dusk ambient light while the vehicle is moving. A map may be comprised of a two-dimensional or three-dimensional grid representing positions in the passenger cabin which may coincide with a gaze point. For each map, an overlay may be provided corresponding to each light source which spans the portions of the passenger cabin for which the light source is intended to contribute illumination. For any particular scenario for which a light source is not being used, then there is no overlay for that light source on the corresponding map. For scenarios in which certain gaze points are to be illuminated by different light sources acting in combination, then the light sources may have overlapping overlays of a map.

An illumination zone includes the reflection surfaces in the passenger cabin which reflect light from a particular light source. The light source itself would preferably not be considered part of an illumination zone. When the gaze point of the occupant coincides with a light source, then it may be desirable to provide no light or only a dim light from that source in order to ensure that the occupant does not become blinded by a bright light being turned on. This is easily built into the corresponding maps.

FIG. 5A shows a map 55 configured for use during a dark condition while the vehicle is stationary. In the dark condition, warm lighting sources including an LED1, LED3, and LED7 are to be activated. For light source LED1, an overlay 56 includes a plurality of regions 57, 58, and 59 which relate coordinates within the passenger cabin to respective brightness levels to be provided from LED1. Region 57 corresponds to a primary illumination zone of LED1. When the gaze point lies within the coordinates of region 57, LED1 may be activated at a full brightness level, for example. For gaze points a bit farther away from a midpoint of the illumination zone of LED1, a region 58 is defined where LED1 may be activated at a slightly reduced brightness level (e.g., 70%). For gaze points even farther away from a midpoint of the illumination zone of LED1, a region 59 is defined where LED1 may be activated at an increasingly reduced brightness level (e.g., 40%).

For light source LED3, an overlay 60 includes regions 61 and 62 which relate coordinates within the passenger cabin to respective brightness levels to be provided from LED3. Region 61 corresponds to a primary illumination zone of LED3. When the gaze point lies within the coordinates of region 61, LED3 may be activated at a full brightness level, for example. For gaze points away from a midpoint of the illumination zone of LED3, region 62 is defined to extend bilaterally where LED3 may be activated at a slightly reduced brightness level (e.g., 50%). Because of the overlapping of overlays 56 and 60, some gaze points result in both LED1 and LED3 being activated simultaneously. For example, when a gaze point corresponds to both region 58 and region 62, then LED1 and LED3 are activated at partial brightness levels. At some other gaze points falling within regions 59 and 61, then LED3 may be activated at full brightness while LED1 is activated at partial brightness. For LED7, a region 63 may be provided for full brightness and a region 64 may be provided for partial brightness. Areas of map 55 not having any activation regions for any light sources correspond to places where no light source is appropriately placed to provide acceptable illumination. Light sources not represented in a map will not be activated when the corresponding conditions are experienced. For example, map 55 is provided for dark ambient light conditions. Therefore, it may include only warm light sources since it is not desired to activate any cool light sources.

For dusky ambient light conditions, a map as shown in FIG. 5B is used which includes overlays for cool light sources LED2, LED4, and LED8. Sources LED2 and LED4 may be included in the same lighting modules as LED1 and LED3, respectively, which results in their map regions being in similar locations. For the dusk/stationary vehicle condition, LED2 has an overlay 66 comprising regions for different respective brightness levels based on a proximity of the gaze point to a respective midpoint of the illumination zone for LED2. LED4 has an overlay 67 comprising regions for different respective brightness levels based on a proximity of the gaze point to a respective midpoint of the illumination zone for LED4. LED8 has an overlay 68. Because of the overlapping of overlays 66 and 67, some gaze points result in an actuated light source with a midpoint close to the gaze point provides a higher brightness level than a different one of the actuated light sources which has a midpoint farther from the gaze point.

When the vehicle is moving, the availability of interior lighting may be significantly curtailed. FIG. 5C shows a map 69 corresponding to a dark/moving condition wherein LED1 is activated only at partial brightness levels and only in response to a gaze point appearing at a more restricted area. Thus, when the gaze point coincides with a region 70, then a first partial brightness (e.g., 40%) of LED1 is provided. When the gaze point coincides with a region 71, then a partial brightness (e.g., 20%) of LED1 may be provided.

Different sets of maps may also be provided for drivers and non-driving passengers. It may be acceptable to provide a higher level of lighting to a non-driving passenger since distraction from driving is not a factor for such a passenger. For an autonomous vehicle, higher brightness levels and less restriction on available light sources may be built into the corresponding brightness maps.

Figure 6:
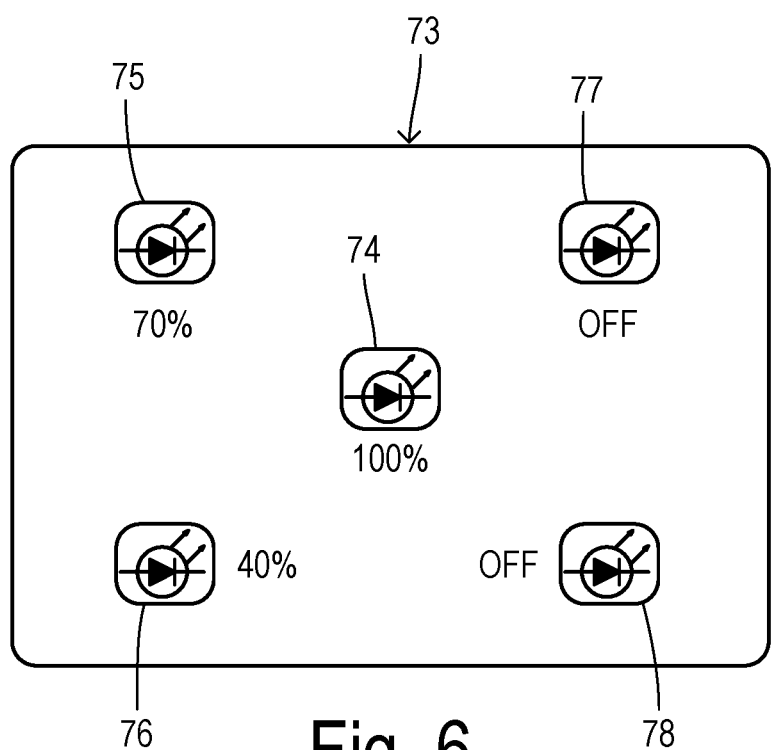
FIG. 6 is a light intensity diagram applied to light sources in response to selecting brightness from a particular brightness map and gaze point.

The maps of brightness levels as specified for different scenarios/conditions provide a focused light field having a color temperature which is able to prevent undesirable loss of dark adaptation. As a result of application of the maps, some light sources may be at full brightness while other are providing partial brightness or no light at all. FIG. 6 shows a passenger cabin 73 with brightness levels indicated for a plurality of LED light sources resulting from a detected gaze direction of a user located in cabin 73.

Figure 7:
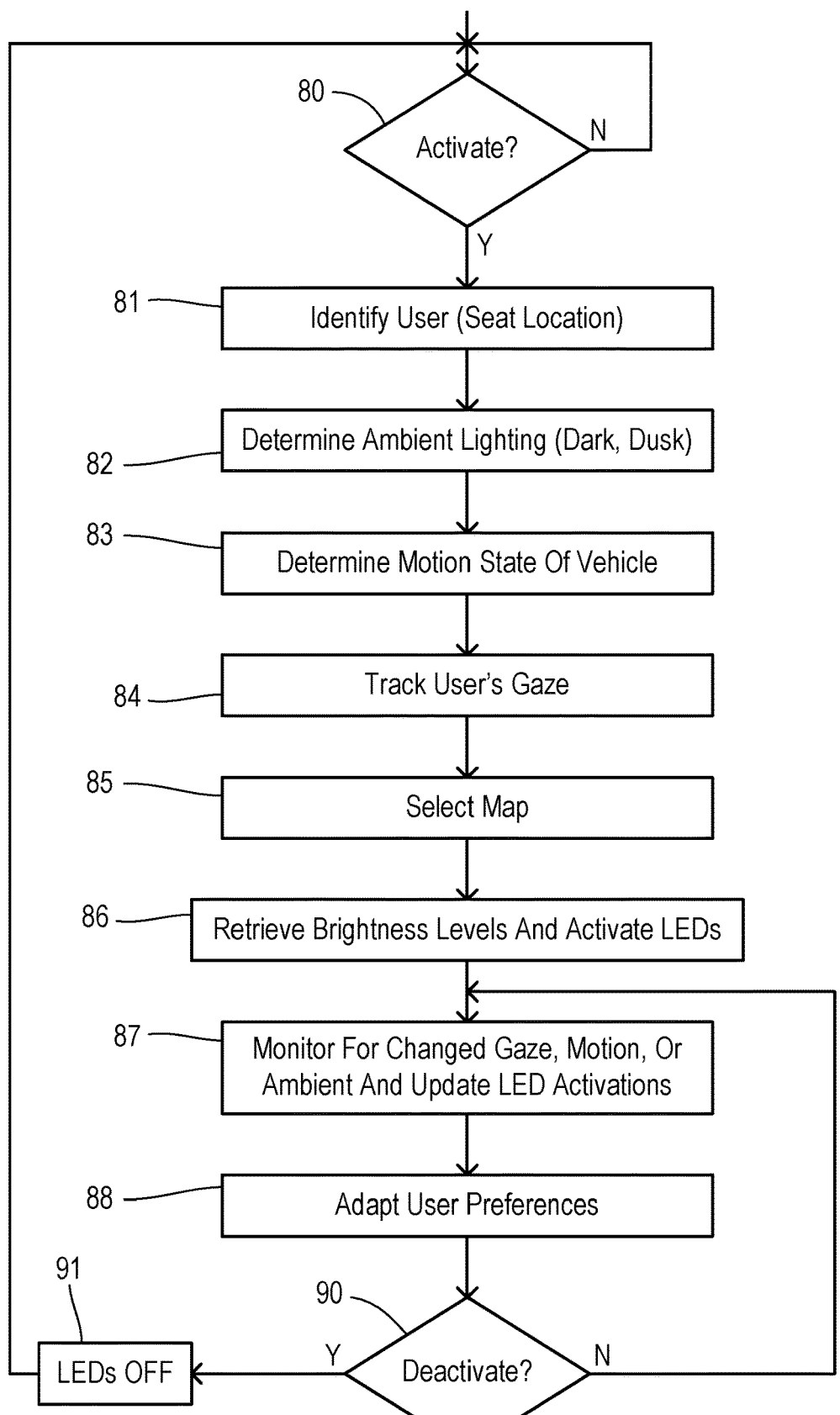
FIG. 7 is a flowchart showing one preferred method of the invention.

FIG. 7 shows one preferred embodiment of a method for controlling interior lighting in a vehicle. In step 80, the method waits for a user to activate the "light focus" feature. Once an activation command is detected in step 80 (e.g., a clap, spoken command, or manual switch activation), then the targeted user is determined in step 81 based on a seat location in the passenger cabin. In some embodiments, a determination of the user may not be necessary because gaze tracking hardware might only be installed to evaluate the driver (i.e., the targeted user is automatically the driver). In step 82, an ambient lighting condition is determined. For example, an ambient light level or intensity is compared with thresholds to classify either a dark condition or a dusk condition. In step 83, a motion state of the vehicle is determined (e.g., whether the vehicle is moving or is stationary). The user's gaze is tracked in step 83 and a gaze point toward which the user is looking is determined. Using the ambient lighting condition and the motion state of the vehicle, a corresponding light-activation map is selected in step 85. In step 86, brightness levels are retrieved from the selected map for each of the LED light sources. LEDs for which a nonzero brightness is retrieved are activated while all others remain off.

While the light focus feature remains active, changes to the user's gaze, the vehicle motion state, and the ambient light levels are monitored in step 87 and any necessary changes in the activation of the LEDs are made. In step 88, adapting for any identified user preferences may be carried out. For example, the user may command increases or decreases of specific light sources while looking at a particular gaze point. The preferences can be used to modify one or more maps for future use. A check is performed in step 90 to determine whether the light focus feature has been deactivated. For example, the user may utter a spoken command to turn the interior lighting back off. If not deactivated, then a return is made to step 87 to continue monitoring. Otherwise, the LEDs are turned off in step 91 and a return is made to step 80.

What is claimed is:

1. A passenger vehicle comprising:
    a passenger cabin configured to receive a plurality of occupants;
    a plurality of light sources mounted in the passenger cabin, wherein each light source is configured to illuminate a respective illumination zone in the passenger cabin, wherein each zone has a midpoint, and wherein each light source is configured to illuminate at a plurality of brightness levels up to a full brightness;
    a gaze tracker monitoring an occupant of the passenger cabin to detect a gaze point at which the occupant is looking; and
    a controller responsive to an illumination request from the occupant to actuate at least two of the light sources to illuminate the passenger cabin at the gaze point, wherein the controller uses the gaze point to select a respective brightness level for each light source based on a proximity of the gaze point to a respective midpoints of the illumination zones, wherein at least a first one of the actuated light sources with a midpoint closer to the gaze point provides a higher brightness level than a second one of the actuated light sources with a midpoint farther from the gaze point, and wherein the respective brightness levels are each proportional to a respective degree of proximity between the respective midpoints and the gaze point.

2. The passenger vehicle of claim 1 wherein, to control each light source, the controller utilizes a respective map relating coordinates of the gaze point to a corresponding brightness level.

3. The passenger vehicle of claim 2 wherein the controller determines whether an ambient lighting condition of the passenger cabin is in a dusk range or in a dark range, and wherein the controller utilizes a set of dusk maps when the ambient lighting condition in the dusk range and utilizes a set of dark maps when in the dark range.

4. The passenger vehicle of claim 3 wherein the plurality of light sources include a plurality of cool light sources and a plurality of warm light sources, and wherein the dusk maps are used to control the cool light sources and the dark maps are used to control the warm light sources.

5. The passenger vehicle of claim 4 wherein the cool light sources have a color temperature in a range of about 3000K to about 6500K, and wherein the warm light sources have a color temperature in a range of about 2000K to about 3500K.

6. The passenger vehicle of claim 3 further comprising an ambient light sensor measuring an ambient light intensity, wherein the ambient light sensor is coupled to the controller, and wherein the controller determines the ambient lighting condition in response to the measured ambient light intensity.

7. The passenger vehicle of claim 3 wherein controller includes a geographic locator and a solar almanac to obtain a sunset time or sunrise time, and wherein the controller determined the ambient lighting condition in response to a difference between an actual time and the obtained sunset or sunrise time.

8. The passenger vehicle of claim 1 wherein the controller determines whether the vehicle is moving or stationary, and wherein the controller utilizes a set of stationary maps when the vehicle is stationary and utilizes a set of moving maps when the vehicle is moving.

9. The passenger vehicle of claim 1 further comprising:
    an ambient light sensor measuring an ambient light intensity;
    wherein the controller determines whether an ambient lighting condition is in a dusk range or in a dark range using the measured ambient light intensity, wherein the plurality of light sources include a plurality of cool light sources and a plurality of warm light sources, wherein the controller actuates only the cool light sources during the dusk range, and wherein the controller actuates only the warm light sources during the dark range.

10. The passenger vehicle of claim 1 wherein the controller is coupled to a speech recognition system, and wherein the illumination request is comprised of a spoken command.

11. The passenger vehicle of claim 1 wherein the illumination request is comprised of a manual action by the occupant which is sensed by the controller.

12. The passenger vehicle of claim 1 wherein the gaze tracker is comprised of a camera-based analysis system.

13. A passenger vehicle comprising:
    a passenger cabin configured to receive a plurality of occupants;
    a plurality of light sources mounted in the passenger cabin, wherein each light source is configured to illuminate a respective illumination zone in the passenger cabin, wherein each zone has a midpoint, and wherein each light source is configured to illuminate at a plurality of brightness levels up to a full brightness;

an ambient light sensor measuring an ambient light intensity;

a gaze tracker monitoring an occupant of the passenger cabin to detect a gaze point to which the occupant is looking; and a controller responsive to an illumination request from the occupant to actuate at least two of the light sources according to a proximity of the gaze point to respective midpoints of the illumination zones, wherein the controller determines whether an ambient lighting condition is in a dusk range or in a dark range using the measured ambient light intensity, wherein the plurality of light sources include a plurality of cool light sources and a plurality of warm light sources, wherein the controller actuates only the cool light sources during the dusk range, and wherein the controller actuates only the warm light sources during the dark range.

14. The passenger vehicle of claim 13 wherein the cool light sources have a color temperature in a range of about 3000K to about 6500K, and wherein the warm light sources have a color temperature in a range of about 2000K to about 3500K.

15. A method of controlling interior lighting in a passenger cabin of a vehicle, comprising the steps of:

measuring an ambient light level;

classifying the ambient light level as a dark condition or a dusk condition in response to at least one threshold;

determining a motion state of the vehicle;

tracking a gaze of a user toward a gaze point in the passenger cabin;

selecting a light-activation map from a plurality of maps according to the classified ambient light level and the vehicle motion state;

retrieving a plurality of brightness levels from the selected map for a plurality of light sources in the vehicle, wherein respective brightness levels for each light source are based on a proximity of the gaze point to respective midpoints of illumination zones provided by the respective light sources, and wherein at least a first one of the actuated light sources with a midpoint closer to the gaze point provides a higher brightness level than a second one of the actuated light sources with a midpoint farther from the gaze point and wherein the respective brightness levels are each proportional to a respective degree of proximity between the respective midpoints and the gaze point.

16. The method of claim 15 wherein the plurality of light sources include a plurality of cool light sources and a plurality of warm light sources, and wherein the maps include dusk maps to control the cool light sources and dark maps to control the warm light sources.

17. The method of claim 16 wherein the cool light sources have a color temperature in a range of about 3000K to about 6500K, and wherein the warm light sources have a color temperature in a range of about 2000K to about 3500K.

* * * * *